United States Patent
Zeng et al.

(10) Patent No.: US 12,294,482 B2
(45) Date of Patent: May 6, 2025

(54) IoT APPLICATION LEARNING

(71) Applicant: Palo Alto Networks, Inc., Santa Clara, CA (US)

(72) Inventors: Jianlin Zeng, Santa Clara, CA (US); Jun Du, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/273,648

(22) PCT Filed: Sep. 3, 2019

(86) PCT No.: PCT/US2019/049400
§ 371 (c)(1),
(2) Date: Mar. 4, 2021

(87) PCT Pub. No.: WO2020/051161
PCT Pub. Date: Mar. 12, 2020

(65) Prior Publication Data
US 2021/0367829 A1 Nov. 25, 2021

Related U.S. Application Data

(60) Provisional application No. 62/726,981, filed on Sep. 4, 2018.

(51) Int. Cl.
*H04L 41/0604* (2022.01)
*H04L 41/0631* (2022.01)
(Continued)

(52) U.S. Cl.
CPC ...... *H04L 41/0609* (2013.01); *H04L 41/0631* (2013.01); *H04L 41/069* (2013.01);
(Continued)

(58) Field of Classification Search
CPC ............ H04L 41/0609; H04L 41/0631; H04L 41/069; H04L 41/16; H04L 41/5022; H04L 43/028
See application file for complete search history.

(56) References Cited

U.S. PATENT DOCUMENTS 6,142,682 A 11/2000 Skogby
6,877,146 B1 4/2005 Teig
(Continued)

FOREIGN PATENT DOCUMENTS

CA 2904463 10/2020
CN 101719899 6/2010
(Continued)

OTHER PUBLICATIONS

Charu C. Aggarwal, Outlier Analysis, Retrieved from the Internet, URL: https://web.archive.org/web/20130210212057/http://charuaggarwal.net/outlierbook.pdf.
(Continued)

*Primary Examiner* — William G Trost IV
*Assistant Examiner* — Abdelbasst Talioua
(74) *Attorney, Agent, or Firm* — Van Pelt, Yi & James LLP

(57) ABSTRACT

A system and method for performing automated learning of an Internet-of-Things (IoT) application are disclosed. The automated learning is based on generation of application-agnostic events, allowing the automated learning to be performed without prior knowledge of the IoT application.

18 Claims, 8 Drawing Sheets

(51) Int. Cl.
*H04L 41/069* (2022.01)
*H04L 41/16* (2022.01)
*H04L 41/5022* (2022.01)
*H04L 43/028* (2022.01)

(52) U.S. Cl.
CPC .......... *H04L 41/16* (2013.01); *H04L 41/5022* (2013.01); *H04L 43/028* (2013.01)

(56) References Cited

U.S. PATENT DOCUMENTS

| | | |
|---|---|---|
| 8,146,133 B2 | 3/2012 | Moon |
| 8,159,966 B1 | 4/2012 | Mabee |
| 8,331,229 B1 | 12/2012 | Hu |
| 8,671,099 B2 | 3/2014 | Kapoor |
| 8,683,598 B1 | 3/2014 | Cashin |
| 8,850,588 B2 | 9/2014 | Kumar |
| 8,863,276 B2 | 10/2014 | Giblin |
| 8,874,550 B1 | 10/2014 | Soubramanien |
| 8,891,528 B2 | 11/2014 | Moriarty |
| 8,898,788 B1 | 11/2014 | Aziz |
| 8,973,088 B1 | 3/2015 | Leung |
| 9,112,895 B1 | 8/2015 | Lin |
| 9,324,119 B2 | 4/2016 | Singh |
| 9,378,361 B1 | 6/2016 | Yen |
| 9,516,053 B1 | 12/2016 | Muddu |
| 9,548,987 B1 | 1/2017 | Poole |
| 9,584,536 B2 | 2/2017 | Nantel |
| 9,600,571 B2 | 3/2017 | Shaashua |
| 9,609,003 B1 | 3/2017 | Chmielewski |
| 9,614,742 B1 | 4/2017 | Zhang |
| 9,661,011 B1 | 5/2017 | Van Horenbeeck |
| 9,692,784 B1 | 6/2017 | Nenov |
| 9,774,604 B2 | 9/2017 | Zou |
| 9,800,603 B1* | 10/2017 | Sidagni ............... H04L 63/1433 |
| 9,807,110 B2 | 10/2017 | Harlacher |
| 9,891,907 B2 | 2/2018 | Searle |
| 9,894,085 B1 | 2/2018 | Dmitriyev |
| 9,910,874 B1 | 3/2018 | Jamail |
| 9,961,096 B1 | 5/2018 | Pierce |
| 9,984,344 B2 | 5/2018 | Singh |
| 10,038,700 B1 | 7/2018 | Duchin |
| 10,043,591 B1 | 8/2018 | Laborde |
| 10,122,747 B2 | 11/2018 | Mahaffey |
| 10,129,118 B1 | 11/2018 | Ghare |
| 10,191,794 B2 | 1/2019 | Smith |
| 10,204,312 B2 | 2/2019 | Singh |
| 10,212,176 B2 | 2/2019 | Wang |
| 10,212,178 B2 | 2/2019 | Cheng |
| 10,229,269 B1 | 3/2019 | Patton |
| 10,237,875 B1 | 3/2019 | Romanov |
| 10,320,613 B1 | 6/2019 | Cam-Winget |
| 10,348,739 B2 | 7/2019 | Greenspan |
| 10,459,827 B1 | 10/2019 | Aghdaie |
| 10,489,361 B2 | 11/2019 | Sisk |
| 10,489,714 B2 | 11/2019 | Lee |
| 10,511,620 B2 | 12/2019 | Schwartz |
| 10,623,389 B2 | 4/2020 | Childress |
| 10,630,728 B2 | 4/2020 | Ghosh |
| 10,764,315 B1 | 9/2020 | Carroll |
| 10,862,911 B2 | 12/2020 | Dezent |
| 10,885,393 B1 | 1/2021 | Sirianni |
| 10,887,306 B2 | 1/2021 | Gupta |
| 11,005,839 B1 | 5/2021 | Shahidzadeh |
| 11,070,568 B2 | 7/2021 | Ektare |
| 11,115,799 B1 | 9/2021 | Du |
| 11,115,823 B1 | 9/2021 | Heiland |
| 11,310,247 B2 | 4/2022 | Manadhata |
| 11,455,641 B1 | 9/2022 | Shahidzadeh |
| 11,477,202 B2 | 10/2022 | De Knijf |
| 2004/0243835 A1 | 12/2004 | Terzis |
| 2005/0044406 A1 | 2/2005 | Stute |
| 2005/0281291 A1 | 12/2005 | Stolfo |
| 2006/0095970 A1 | 5/2006 | Rajagopal |
| 2006/0265397 A1 | 11/2006 | Bryan |
| 2007/0094725 A1 | 4/2007 | Borders |
| 2008/0059536 A1 | 3/2008 | Brock |
| 2009/0180391 A1 | 7/2009 | Petersen |
| 2010/0054278 A1 | 3/2010 | Stolfo |
| 2010/0284282 A1 | 11/2010 | Golic |
| 2011/0022812 A1 | 1/2011 | Van Der Linden |
| 2011/0087626 A1 | 4/2011 | Yeleshwarapu |
| 2011/0231510 A1 | 9/2011 | Korsunsky |
| 2011/0239267 A1 | 9/2011 | Lyne |
| 2012/0065749 A1 | 3/2012 | Hunter |
| 2012/0102543 A1 | 4/2012 | Kohli |
| 2012/0174221 A1 | 7/2012 | Han |
| 2012/0240185 A1 | 9/2012 | Kapoor |
| 2013/0086261 A1* | 4/2013 | Lim ...................... G06F 16/93 709/224 |
| 2013/0173621 A1 | 7/2013 | Kapoor |
| 2013/0247190 A1 | 9/2013 | Spurlock |
| 2013/0305357 A1 | 11/2013 | Ayyagari |
| 2013/0305358 A1 | 11/2013 | Gathala |
| 2014/0006479 A1 | 1/2014 | Maloo |
| 2014/0157405 A1 | 6/2014 | Joll |
| 2014/0244834 A1 | 8/2014 | Guedalia |
| 2014/0281912 A1 | 9/2014 | Doi |
| 2014/0325670 A1 | 10/2014 | Singh |
| 2014/0337862 A1 | 11/2014 | Valencia |
| 2015/0039513 A1 | 2/2015 | Adjaoute |
| 2015/0055623 A1 | 2/2015 | Li |
| 2015/0161024 A1 | 6/2015 | Gupta |
| 2015/0199610 A1 | 7/2015 | Hershberg |
| 2015/0229654 A1 | 8/2015 | Perier |
| 2015/0256431 A1 | 9/2015 | Buchanan |
| 2015/0262067 A1 | 9/2015 | Sridhara |
| 2015/0271192 A1 | 9/2015 | Crowley |
| 2015/0293954 A1 | 10/2015 | Hsiao |
| 2015/0295945 A1 | 10/2015 | Canzanese, Jr. |
| 2015/0324559 A1 | 11/2015 | Boss |
| 2015/0356451 A1 | 12/2015 | Gupta |
| 2016/0006815 A1 | 1/2016 | Dong |
| 2016/0028750 A1 | 1/2016 | Di Pietro |
| 2016/0036819 A1 | 2/2016 | Zehavi |
| 2016/0048984 A1 | 2/2016 | Frigo |
| 2016/0119372 A1 | 4/2016 | Borlick |
| 2016/0128043 A1 | 5/2016 | Shuman |
| 2016/0164721 A1 | 6/2016 | Zhang |
| 2016/0173446 A1 | 6/2016 | Nantel |
| 2016/0173495 A1 | 6/2016 | Joo |
| 2016/0182497 A1 | 6/2016 | Smith |
| 2016/0196558 A1 | 7/2016 | Mercille |
| 2016/0210556 A1 | 7/2016 | Ben Simhon |
| 2016/0212099 A1 | 7/2016 | Zou |
| 2016/0218949 A1 | 7/2016 | Dasgupta |
| 2016/0261465 A1 | 9/2016 | Gupta |
| 2016/0267406 A1 | 9/2016 | Bodo |
| 2016/0267408 A1 | 9/2016 | Singh |
| 2016/0277435 A1 | 9/2016 | Salajegheh |
| 2016/0301707 A1* | 10/2016 | Cheng .................... H04L 67/12 |
| 2016/0301717 A1 | 10/2016 | Dotan |
| 2016/0337127 A1 | 11/2016 | Schultz |
| 2016/0352685 A1 | 12/2016 | Park |
| 2016/0366141 A1 | 12/2016 | Smith |
| 2016/0366181 A1 | 12/2016 | Smith |
| 2016/0381030 A1* | 12/2016 | Chillappa ............... H04W 4/38 726/11 |
| 2017/0006028 A1 | 1/2017 | Tunnell |
| 2017/0006135 A1 | 1/2017 | Siebel |
| 2017/0011406 A1 | 1/2017 | Tunnell |
| 2017/0013005 A1 | 1/2017 | Galula |
| 2017/0055913 A1 | 3/2017 | Bandyopadhyay |
| 2017/0063774 A1 | 3/2017 | Chen |
| 2017/0063889 A1* | 3/2017 | Muddu .................. H04L 63/20 |
| 2017/0063905 A1 | 3/2017 | Muddu |
| 2017/0085580 A1 | 3/2017 | Thanos |
| 2017/0093915 A1 | 3/2017 | Ellis |
| 2017/0118237 A1 | 4/2017 | Devi Reddy |
| 2017/0118240 A1 | 4/2017 | Devi Reddy |
| 2017/0124660 A1 | 5/2017 | Srivastava |
| 2017/0126704 A1 | 5/2017 | Nandha Premnath |
| 2017/0149813 A1 | 5/2017 | Wright |
| 2017/0180380 A1 | 6/2017 | Bagasra |

(56) References Cited

U.S. PATENT DOCUMENTS

| | | |
|---|---|---|
| 2017/0180399 A1 | 6/2017 | Sukhomlinov |
| 2017/0188242 A1 | 6/2017 | Ghosh |
| 2017/0200061 A1 | 7/2017 | Julian |
| 2017/0214701 A1 | 7/2017 | Hasan |
| 2017/0230402 A1 | 8/2017 | Greenspan |
| 2017/0232300 A1 | 8/2017 | Tran |
| 2017/0235585 A1 | 8/2017 | Gupta |
| 2017/0235783 A1 | 8/2017 | Chen |
| 2017/0242414 A1 | 8/2017 | Coote |
| 2017/0244737 A1 | 8/2017 | Kuperman |
| 2017/0251007 A1 | 8/2017 | Fujisawa |
| 2017/0272554 A1 | 9/2017 | Kwan |
| 2017/0279685 A1 | 9/2017 | Mota |
| 2017/0289184 A1 | 10/2017 | C |
| 2017/0331671 A1 | 11/2017 | Olsson |
| 2017/0331906 A1 | 11/2017 | Choi |
| 2017/0339178 A1 | 11/2017 | Mahaffey |
| 2017/0344407 A1 | 11/2017 | Jeon |
| 2017/0346677 A1 | 11/2017 | Suryanarayana |
| 2018/0007055 A1* | 1/2018 | Infante-Lopez ........ H04W 4/80 |
| 2018/0007058 A1 | 1/2018 | Zou |
| 2018/0012227 A1 | 1/2018 | Tunnell |
| 2018/0018684 A1 | 1/2018 | Orr |
| 2018/0027006 A1 | 1/2018 | Zimmermann |
| 2018/0027020 A1 | 1/2018 | Pallas |
| 2018/0039555 A1 | 2/2018 | Salunke |
| 2018/0078843 A1 | 3/2018 | Tran |
| 2018/0115574 A1 | 4/2018 | Ridley |
| 2018/0117446 A1 | 5/2018 | Tran |
| 2018/0117447 A1 | 5/2018 | Tran |
| 2018/0124096 A1 | 5/2018 | Schwartz |
| 2018/0139227 A1 | 5/2018 | Martin |
| 2018/0144139 A1 | 5/2018 | Cheng |
| 2018/0173881 A1 | 6/2018 | Oberheide |
| 2018/0191729 A1 | 7/2018 | Whittle |
| 2018/0191746 A1 | 7/2018 | De Knijf |
| 2018/0191755 A1 | 7/2018 | Monaco |
| 2018/0191848 A1 | 7/2018 | Bhattacharya |
| 2018/0205793 A1 | 7/2018 | Loeb |
| 2018/0212768 A1 | 7/2018 | Kawashima |
| 2018/0234302 A1 | 8/2018 | James |
| 2018/0234519 A1 | 8/2018 | Boyapalle |
| 2018/0248902 A1 | 8/2018 | Mircea |
| 2018/0255084 A1 | 9/2018 | Kotinas |
| 2018/0261070 A1* | 9/2018 | Stevens ................ G06F 3/0486 |
| 2018/0264347 A1 | 9/2018 | Tran |
| 2018/0285234 A1 | 10/2018 | Degaonkar |
| 2018/0293387 A1 | 10/2018 | Bar-El |
| 2018/0295148 A1 | 10/2018 | Mayorgo |
| 2018/0302440 A1 | 10/2018 | Hu |
| 2018/0349598 A1 | 12/2018 | Harel |
| 2018/0349612 A1 | 12/2018 | Harel |
| 2018/0351972 A1 | 12/2018 | Yu |
| 2018/0357556 A1 | 12/2018 | Rai |
| 2018/0375887 A1 | 12/2018 | Dezent |
| 2019/0014169 A1 | 1/2019 | Chung |
| 2019/0019249 A1 | 1/2019 | Bhattacharjee |
| 2019/0037041 A1* | 1/2019 | Ikeuchi ................ H04L 67/125 |
| 2019/0081961 A1 | 3/2019 | Bansal |
| 2019/0089747 A1* | 3/2019 | Wang .................. H04L 63/1441 |
| 2019/0098028 A1 | 3/2019 | Ektare |
| 2019/0098058 A1 | 3/2019 | Ikegami |
| 2019/0109717 A1 | 4/2019 | Reddy |
| 2019/0121978 A1 | 4/2019 | Kraemer |
| 2019/0132205 A1* | 5/2019 | Du ....................... H04L 41/145 |
| 2019/0138512 A1 | 5/2019 | Pourmohammad |
| 2019/0140906 A1* | 5/2019 | Furuichi ............. H04L 41/0823 |
| 2019/0166016 A1* | 5/2019 | Livanos .................. H04L 67/61 |
| 2019/0182278 A1 | 6/2019 | Das |
| 2019/0253319 A1 | 8/2019 | Kampanakis |
| 2019/0268267 A1* | 8/2019 | Pignataro ............. H04L 45/741 |
| 2019/0268305 A1 | 8/2019 | Xu |
| 2019/0296979 A1 | 9/2019 | Gupta |
| 2019/0349426 A1* | 11/2019 | Smith ..................... H04W 4/70 |
| 2019/0361917 A1 | 11/2019 | Tran |
| 2019/0373007 A1 | 12/2019 | Salunke |
| 2019/0373472 A1 | 12/2019 | Smith |
| 2019/0387399 A1 | 12/2019 | Weinberg |
| 2020/0036603 A1 | 1/2020 | Nieves |
| 2020/0074085 A1 | 3/2020 | Cheng |
| 2020/0076846 A1 | 3/2020 | Pandian |
| 2020/0076853 A1 | 3/2020 | Pandian |
| 2020/0117690 A1 | 4/2020 | Tran |
| 2020/0156654 A1 | 5/2020 | Boss |
| 2020/0162278 A1 | 5/2020 | Delaney |
| 2020/0162503 A1 | 5/2020 | Shurtleff |
| 2020/0177485 A1 | 6/2020 | Shurtleff |
| 2020/0177589 A1 | 6/2020 | Mangalvedkar |
| 2020/0195679 A1 | 6/2020 | Du |
| 2020/0211721 A1 | 7/2020 | Ochoa |
| 2020/0213146 A1 | 7/2020 | Kodam |
| 2020/0285457 A1* | 9/2020 | Meriac .................... H04L 67/34 |
| 2020/0285997 A1 | 9/2020 | Bhattacharyya |
| 2020/0409957 A1 | 12/2020 | Zhang |
| 2021/0203615 A1 | 7/2021 | Roy |
| 2021/0360406 A1 | 11/2021 | Heiland |
| 2022/0060491 A1 | 2/2022 | Achleitner |
| 2022/0086071 A1 | 3/2022 | Sivaraman |
| 2022/0138634 A1 | 5/2022 | Covell |
| 2022/0159020 A1 | 5/2022 | Wang |
| 2022/0210065 A1 | 6/2022 | Khanna |
| 2022/0210066 A1 | 6/2022 | Khanna |
| 2023/0049886 A1 | 2/2023 | Sesha |

FOREIGN PATENT DOCUMENTS

| | | | |
|---|---|---|---|
| CN | 102025577 | | 7/2012 |
| CN | 102291430 | | 11/2013 |
| CN | 108306911 | * 1/2017 | ............. H04L 67/12 |
| CN | 107862468 | | 3/2018 |
| CN | 104837158 | | 5/2018 |
| CN | 108650133 | | 10/2018 |
| CN | 105659633 | | 4/2020 |
| CN | 107135093 | | 5/2020 |
| CN | 108306911 B | * 12/2020 | ............. H04L 67/12 |
| EP | 3136297 | | 3/2017 |
| EP | 3576373 | | 12/2019 |
| JP | 2018513467 | | 5/2018 |
| JP | 2020503784 | | 1/2020 |
| KR | 20170059546 | | 5/2017 |
| WO | 2019218874 | | 11/2019 |

OTHER PUBLICATIONS

Hirofumi Nakakoji, et al., "Study of the Incident Tendency Detection Method on Frequency Analysis," Technical Report of IEICE, Japan, The Institute of Electronics, Information and Communication Engineers (IEICE), Jul. 14, 2005, vol. 105, No. 193, pp. 83-88.

Arash Fasihi, Rule Based Inference and Action Selection Based on Monitoring Data in IoT, Dec. 1, 2015.

Cramer et al., Detecting Anomalies in Device Event Data in the IoT, Proceedings of the 3td International Conference on Internet of Things, Big Data and Security, Mar. 21, 2018, pp. 52-62.

Midi et al., Kalis—A System for Knowledge-driven Adaptable Intrusion Detection for the Internet of Things, 2017 IEEE 37th International Conference on Distributed Computing Systems, pp. 656-666.

Al-Shaer et al., Design and Implementation of Firewall Policy Advisor Tools, 2002.

Al-Shaer et al., Firewall Policy Advisor for Anomaly Discovery and Rule Editing, Integrated Network Management VIII, 2003.

Author Unknown, Cisco Encrypted Traffic Analytics, Feb. 10, 2021.

Blackstock et al., IoT Interoperability: A Hub-based Approach, 2014, IEEE International Conference on the Internet of Things (IOT), pp. 80-84.

Charyyev et al., Locality-Sensitive IoT Network Traffic Fingerprinting for Device Identification, IEEE Internet of Things Journal, 2020, vol. 8, No. 3, pp. 1272-1281.

Du et al., A Lightweight Flow Feature-Based IoT Device Identification Scheme, Security and Communication Networks, 2022.

(56) References Cited

OTHER PUBLICATIONS

Fredj et al., A Scalable IoT Service Search Based on Clustering and Aggregation, 2013 IEEE International Conference on Green Computing and Communication and IEEE Internet of Things and IEEE Cyber, Physical and Social Computing, pp. 1-8.

International Application No. PCT/US2016/025661, International Search Report and Written Opinion mailed Jul. 7, 2016.

Li et al., A Distributed Consensus Algorithm for Decision Making in Service-Oriented Internet of Things, Old Dominion University, ODU Digital Commons, 2014.

Liu et al., A Lightweight Anomaly Mining Algorithm in the Internet of Things, 2014 IEEE 5th International Conference on Software Engineering and Service Science, 2014, pp. 1142-1145.

Martin et al., Requirements and Recommendations for CWE Compatibility and CWE Effectiveness, Version 1.0, Jul. 28, 2011.

Miloslavskaya et al., Ensuring Information Security for Internet of Things, 2017, IEEE 5th International Conference of Future Internet of Things and Cloud, pp. 62-69.

National Electrical Manufacturers Association, Manufacturer Disclosure Statement for Medical Device Security, HIMSS/NEMA Standard HN Jan. 2013, 2013.

Nguyen et al., A Software-Defined Model for IoT Clusters: Enabling Applications on Demand, Faculty of Engineering and IT, University of Technology Sydney, Australia, IEEE Xplore, Apr. 23, 2018.

Sivanathan et al., Classifying IoT Devices in Smart Environments Using Network Traffic Characteristics, IEEE, TMC, No. 8, pp. 1745-1759, Aug. 2018.

Sivanathan et al., Detecting Behavioral Change of IoT Devices Using Clustering-Based Network Traffic Modeling, IEEE LCN 2019, Mar. 30, 2020.

Sivanathan et al., Inferring IoT Device Types from Network Behavior Using Unsupervised Clustering, IEEE ICN 2019, Oct. 2019.

Zhao et al., A Few-Shot Learning Based Approach to IoT Traffic Classification, IEEE Communications Letters, 2021.

Chen et al., A Model-Based Validated Autonomic Approach to Self-Protect Computing Systems, IEEE Internet of Things Journal, Oct. 2014, pp. 446-460, vol. 1, No. 5.

Meidan et al., ProfilloT: A Machine Learning Approach for IoT Device Identification Based on Network Traffic Analysis, In Proceedings of the Symposium on Applied Computing (SAC'17), Apr. 3-7, 2017, pp. 506-509.

Fahim et al., Anomaly detection, analysis and prediction techniques in IoT environment: A systematic literature review, IEEE Access, vol. 7, 2019, pp. 81664-81681.

Nassif et al., Machine learning for anomaly detection: A systematic review, IEEE Access, vol. 9, 2021, pp. 78658-78700.

Liu et al., Noise removal in the presence of significant anomalies for industrial IoT sensor data in manufacturing, IEEE Internet of Things Journal, vol. 7, No. 8, Aug. 2020, pp. 7084-7096.

Pahl et al., All eyes on you: Distributed Multi-Dimensional IoT microservice anomaly detection, 14th International Conference on Network and Service Management (CNSM), IEEE, 2018, pp. 72-80.

\* cited by examiner

IoT APPLICATION LEARNING

CROSS REFERENCE TO OTHER APPLICATIONS

This application claims priority to International (PCT) Application No. PCT/US19/49400, entitled IoT APPLICATION LEARNING filed Sep. 3, 2019, which claims priority to U.S. Provisional Patent Application No. 62/726,981, entitled IoT APPLICATION LEARNING filed Sep. 4, 2018, each of which is incorporated herein by reference for all purposes.

DETAILED DESCRIPTION

Figure 1:
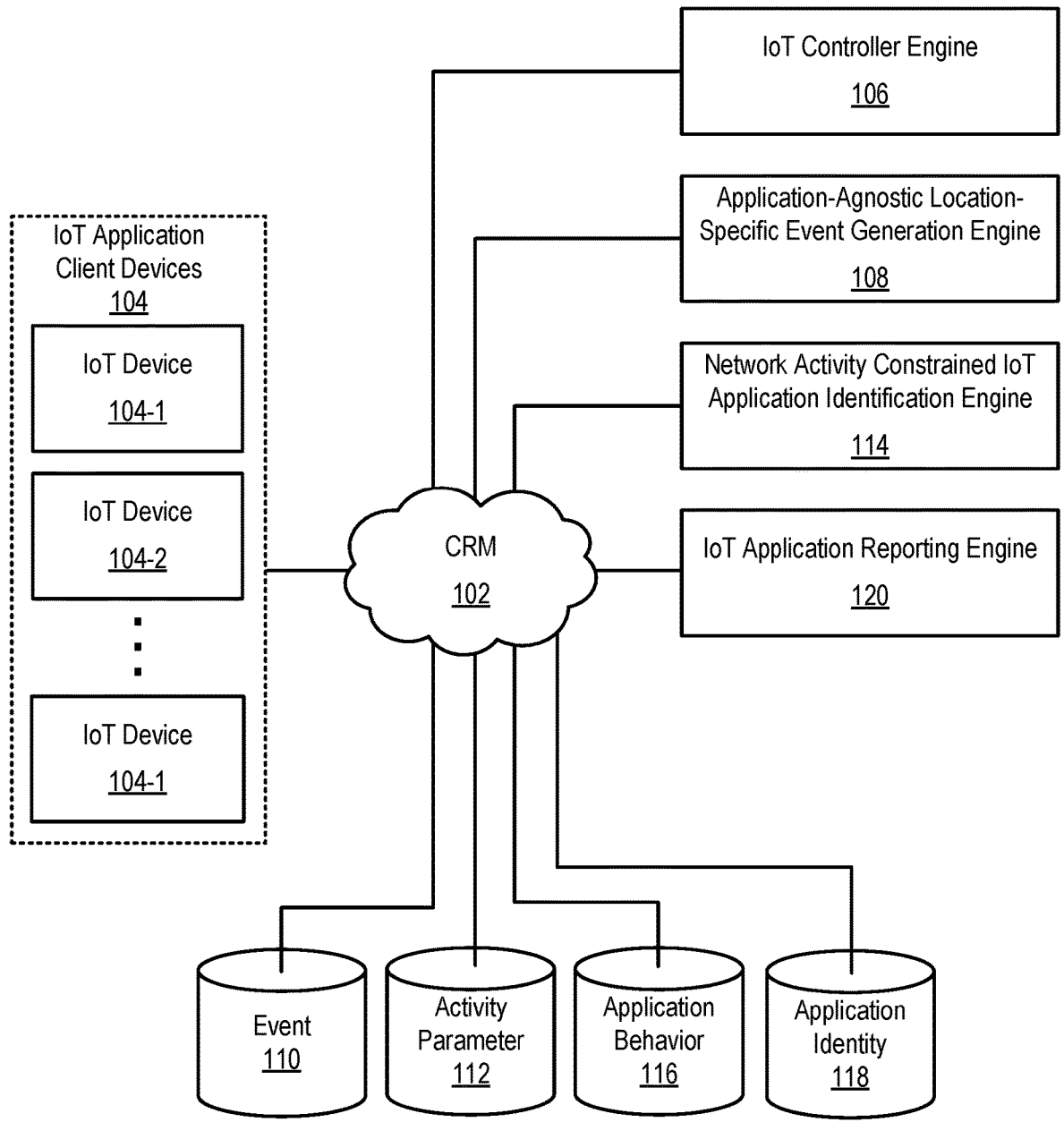
FIG. 1 depicts a diagram of an example of a system for Internet of Things (IoT) application learning.

FIG. 1 depicts a diagram 100 of an example of a system for Internet of Things (IoT) application learning. The diagram 100 includes a computer-readable medium (CRM) 102, IoT device 104-1 ... 104-$n$ (collectively, "IoT devices 104") coupled to the CRM 102, an IoT controller engine 106 coupled to the CRM 102, an application-agnostic location-specific event generation engine 108 coupled to the CRM 102, an event datastore 110 coupled to the CRM 102, an activity parameter datastore 112 coupled to the CRM 102, a network activity constrained IoT application identification engine 114 coupled to the CRM 102, an application behavior datastore 116 coupled to the CRM 102, an application identity datastore 118 coupled to the CRM 102, and an IoT application reporting engine 120 coupled to the CRM 102.

The CRM 102 and other computer readable mediums discussed in this paper are intended to represent a variety of potentially applicable technologies. For example, the CRM 102 can be used to form a network or part of a network. Where two components are co-located on a device, the CRM 102 can include a bus or other data conduit or plane. Where a first component is located on one device and a second component is located on a different device, the CRM 102 can include a wireless or wired back-end network or LAN. The CRM 102 can also encompass a relevant portion of a WAN or other network, if applicable.

The computer readable mediums discussed in this paper are intended to include all mediums that are statutory (e.g., in the United States, under 35 U.S.C. 101), and to specifically exclude all mediums that are non-statutory in nature to the extent the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 1, the IoT devices 104 are intended to represent purposefully built or configured IoT devices. Examples of IoT devices include thermostats, mobile devices, biological managers, sensory devices, and functionality performing devices. In being purposely built IoT devices, the IoT devices 104 are built to have specific operational parameters. For example, a thermometer may be built to provide signals from a temperature sensor. In being purposely configured IoT devices, the IoT devices 104 can be configured to operate according to specific operational parameters in accordance with input from a human or artificial agent. For example, an IoT device of the IoT devices 104 can be a thermostat configured to control an air conditioner to cool a room to a configurable temperature at a configurable time. Other examples include infusion pumps, imaging devices (e.g., a CT-scanner, an X-ray machine, a picture archiving and communication system (PACS), and a digital imaging and communications in medicine (DICOM®) workstation). As another example, an agent can specify an IoT device should not communicate with a specific data source and only be used to view DICOM pictures, and the IoT device can be configured to refrain from communicating with the specific data source or from performing an action other than viewing DICOM pictures as part of purposeful configuration. For a purposely configured device to be considered an IoT device, it should operate within IoT operational parameters; deviation from the IoT operational parameters can cause risk to be elevated and/or to trigger alerts, such as "browser usage" if the deviation can be ascertained.

In a specific implementation, the IoT devices 104 include wired or wireless interfaces through which the IoT devices 104 can send and receive data over wired and wireless connections. As used in this paper, the term "implementation" means an implementation that serves to illustrate by way of example and not necessarily by limitation. The IoT devices 104 can have unique identifiers that can be used in the transmission of data through a network. Unique identifiers of the IoT devices 104 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. Depending upon implementation-specific or other considerations, the IoT devices 104 can include applicable communication interfaces for receiving and sending data according to an applicable wireless device protocol. Examples of applicable wireless device protocols include Wi-Fi, ZigBee®, Bluetooth®, and other applicable low-power communication standards.

In a specific implementation, the IoT devices 104 act as stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the IoT devices 104 are configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the IoT devices 104 have respective personalities. As used in this paper, a personality is a collection of behaviors; behavior is used to describe a specific type of device. As used in this paper, a behavior is an application-driven collection of one or more related activities. A personality can be bad, which means the personality is identifiable as one that belongs to a device that exhibits or has an unacceptable risk to later exhibit undesirable behavior. A personality can be good, which means the personality is identifiable as one that belongs to a device that has not and is not expected to later exhibit undesirable behavior. Devices can exhibit anomalous behavior, and anomaly detection is a useful tool to determine whether a device is exhibiting undesirable behavior, so anomalous behavior is sometimes associated with undesirable behavior. However, over time, anomalous behavior can be indicative of an as-of-yet-unidentified, but potentially good personality. If a device with a first personality exhibits anomalous behavior, it may be possible to define a second personality similar in some ways to the first personality, but for which certain behavior is not anomalous. Similarly, a first personality could be better defined over time to include what was previously anomalous behavior as non-anomalous behavior. Accordingly, it may be desirable to provide a system that can not only classify IoT devices as having various personalities, but also to provide a system that can allow personality to have malleable definitions and that can define new personalities over time.

The IoT controller engine 106 is intended to represent a system that provides a service to one or more of the IoT devices 104. In a specific implementation, "server part" of an application runs on (or through) the IoT controller engine 106, which can be implemented as a virtual machine and/or a cluster of application servers and a "client part" runs on one or more of the IoT devices 104. The "server part" and the "client part" can be referred to collectively as an IoT application, and the IoT controller engine can be referred to as an IoT application controller engine. (It may be noted that the "client part" is sometimes conflated with the front end of a server, in which case the "client part" could be characterized as the front end of a server and the "server part" as the back end of the server; context will dictate.) In a specific implementation, the IoT controller engine 106 is located "on-prem," an example of which is provided by way of example in FIG. 2.

Figure 2:
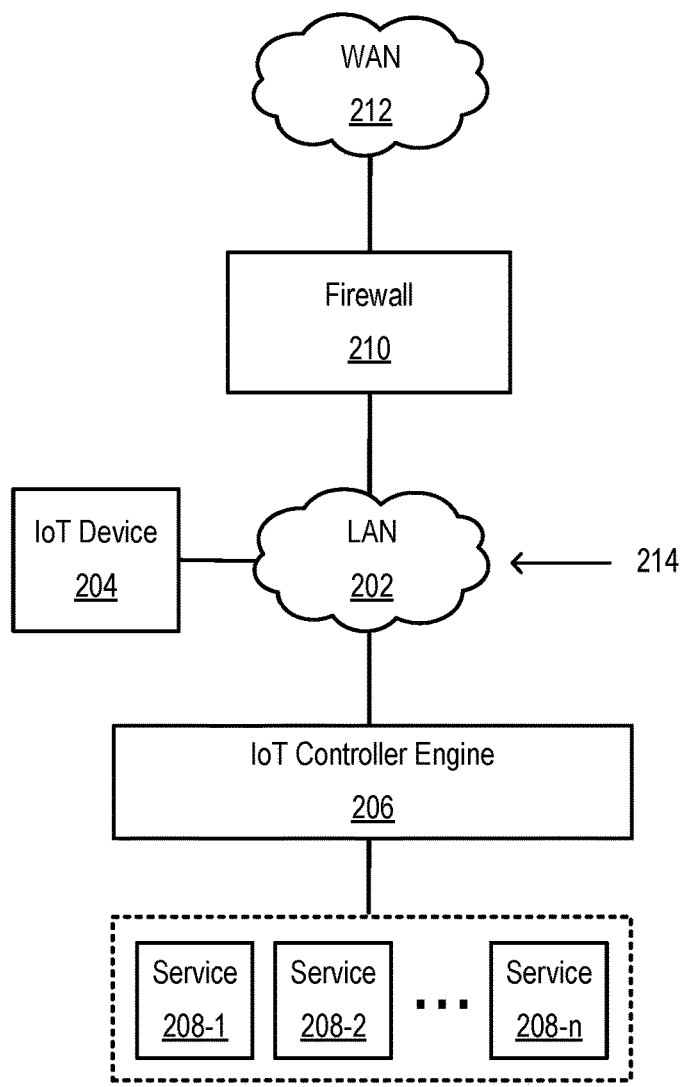
FIG. 2 depicts a diagram of an example of an on-prem IoT controller.

FIG. 2 depicts a diagram 200 of an example of an on-prem IoT controller. The diagram 200 includes a LAN 202, an IoT device 204 coupled to the LAN 202, an IoT controller engine 206 coupled to the LAN 202, a service 208-1 to a service 208-n (the services 208) are coupled to the IoT controller engine 206, a firewall 210 coupled to the LAN 202, and a WAN 212 coupled to the firewall 208. It may be noted that the IoT device 204, IoT controller engine 206, the services 208, and the firewall 210 can also be referred to as "on" the LAN 202 or "on-prem."

The LAN 202 is intended to represent a relatively local network of IoT devices, IoT controller engines, and potentially other devices. It should be noted enterprise networks can include geographically distributed LANs coupled across WAN segments. In a distributed enterprise network, gateways may be local at each LAN (each LAN is sometimes referred to as a Basic Service Set (BSS) in IEEE 802.11 parlance, though no explicit requirement is suggested here) or localized using, e.g., VLAN tunneling (the connected LANs are sometimes referred to as an Extended Service Set (ESS) in IEEE 802.11 parlance, though no explicit requirement is suggested here), though some form of gateway functionality is generally still needed to connect the various LANs in a geographically distributed enterprise network.

The IoT device 204 can be implemented in a manner similar to that described for the IoT devices 104 with reference to FIG. 1. The IoT controller engine 206 can be implemented in a manner similar to that described for the IoT controller 106 with reference to FIG. 1. The services 208 are intended to represent on-prem services provided through the IoT controller engine 206 to the IoT devices 204. The firewall 210 is intended to represent an example of a device located between on-prem devices (such as the IoT device 204 and the IoT controller engine 206) of the LAN 202 and off-prem devices of the WAN 212 (which generally includes other networks, including LANs, not shown).

In a specific implementation, an inspector (such as is included in the application-agnostic location-specific event generation engine 108 of FIG. 1) is coupled to the LAN 202 at the location identified by the arrow 214 (i.e., the inspector is "on" the LAN 202 and may be referred to as an on-prem inspector). In such an implementation, it would not be unusual for network traffic to be transmitted between the IoT device 204 and the IoT controller engine 206 in clear text. For example, the inspector can be implemented as a sniffer that is capable of detecting network traffic between the IoT device 204 and the IoT controller engine 206.

Figure 3:
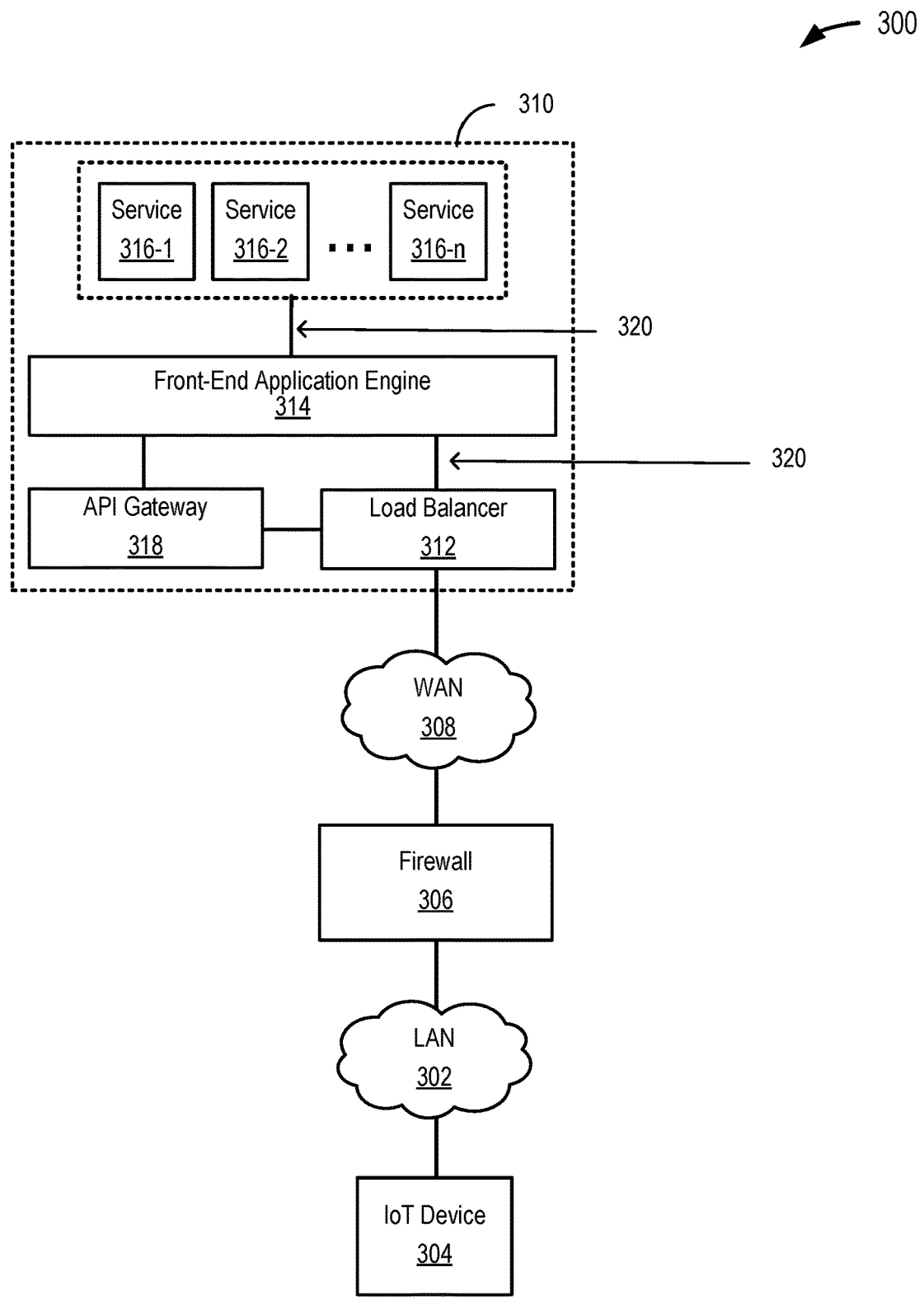
FIG. 3 depicts a diagram of an example of an off-prem IoT application controller.

Referring once again to the example of FIG. 1, in a specific implementation, the IoT controller engine 106 is located "off-prem," an example of which is provided by way of example in FIG. 3.

FIG. 3 depicts a diagram 300 of an example of an off-prem IoT application controller. The diagram 300 includes a LAN 302, an IoT device 304 coupled to the LAN 302, a firewall 306 coupled to the LAN 302, a WAN 308 coupled to the firewall 306, and an IoT application controller 310 coupled to the WAN 308. It may be noted that the IoT device 304 and the firewall 306 can also be referred to as "on" the LAN 302 or "on-prem," while the IoT application controller engine 310 can also be referred to as "on" the WAN 308 (and not on the LAN 302) or "off-prem." In a specific implementation, the IoT application controller 310 is implemented in the cloud.

The LAN 302 is intended to represent a relatively local network of IoT devices and potentially other devices. The IoT device 304 can be implemented in a manner similar to that described for the IoT devices 104 with reference to FIG. 1. The firewall 306 is intended to represent an example of a device located between on-prem devices (such as the IoT device 304) of the LAN 302 and off-prem devices (such as the IoT application controller engine 310) on the WAN 308. A link between the WAN 308 and the IoT application controller engine 310 can be accomplished via, e.g., a virtual private network (VPN) engine (not shown) with a clear text protocol (a RESTful interface would be less likely, but not necessarily inapplicable).

The IoT application controller engine 310 can be implemented in a manner similar to that described for the IoT controller 106 with reference to FIG. 1. In the diagram 300, the IoT application controller engine 306 includes a load balancer 312, a front-end application engine 314 coupled to the load balancer 312, a service 316-1 to a service 316-n (collectively, the services 316) coupled to the front-end application engine 314, and an API gateway 318 coupled to the load balancer 312 and the front-end application engine 314.

The load balancer 312 is intended to represent a server-side engine through which external clients can be coupled to services. In a specific implementation, the load balancer 312 listens on a port to which external clients connect to access services. The load balancer forwards requests to backend servers associated with the services. Advantageously, the load balancer 312 prevents the IoT device 304 from contacting backend servers directly. The load balancer 312 can be implemented so as to avoid making it a single point of failure, such as by implementing it as a high-availability pair of engines that can replicate session persistence data if desirable for a given application.

The front-end application engine 314 is intended to represent an interface between the load balancer 312 (client side) and the services 316 (server side). The services 316 can be referred to as off-prem services or, in a specific implementation, off-prem application services.

In a specific implementation, the services 316 represent a portion of a microservices architecture in which services are fine-grained and protocols lightweight. Microservices-based architectures enable continuous delivery and deployment and frequently include processes that communicate over a network to fulfill a goal using technology-agnostic protocols such as HTTP (but may include other kinds of inter-process communication mechanisms such as shared memory); independently deployable services; easily replaceable services; services organized around capabilities (e.g., user interface front-end, recommendation, logistics, billing, etc.); services implemented using different programming languages, databases, hardware, and software environment, depending on what fits best; and/or relatively small services that are messaging enables, bounded by contexts, autonomously developed, independently deployable, decentralized, and built and released with automated processes. Generally, a microservices-based architecture naturally enforces a distributed structure; lends itself to a continuous delivery software development process; adheres to principles such as fine-grained interfaces, business-driven deployment, cloud application architectures, polyglot programming and persistence, lightweight container development, decentralized continuous delivery, and DevOps with holistic service monitoring; and/or provides characteristics that are beneficial to scalability.

The API gateway 318 is intended to represent an interface between the load balancer 312 and the services 316, but it acts as an API front-end, receiving API requests. In a specific implementation, the API gateway 318 enforces throttling and security policies, passes requests to the (back-end) services 316, and passes responses to the IoT device 304. The API gateway 318 may or may not also include a transformation engine to orchestrate and modify requests and responses on the fly, collect analytics data, provide caching, and support authentication, authorization, security, audit, and regulatory compliance.

In a specific implementation, an inspector is operationally connected to the IoT application controller engine 306 at the locations identified by the arrows 320. In such an implementation, an inspector is located "behind" the load balancer 314 (and may be referred to as an application load balancer inspector) and inspectors are located between the front-end application engine 314 and each of the services 316 (e.g., there is an inspector in front of each of the services 316, which may be referred to as application service inspectors). Behind is intended to mean the load balancer 314 is between the inspector and the IoT device 304.

Figure 4:
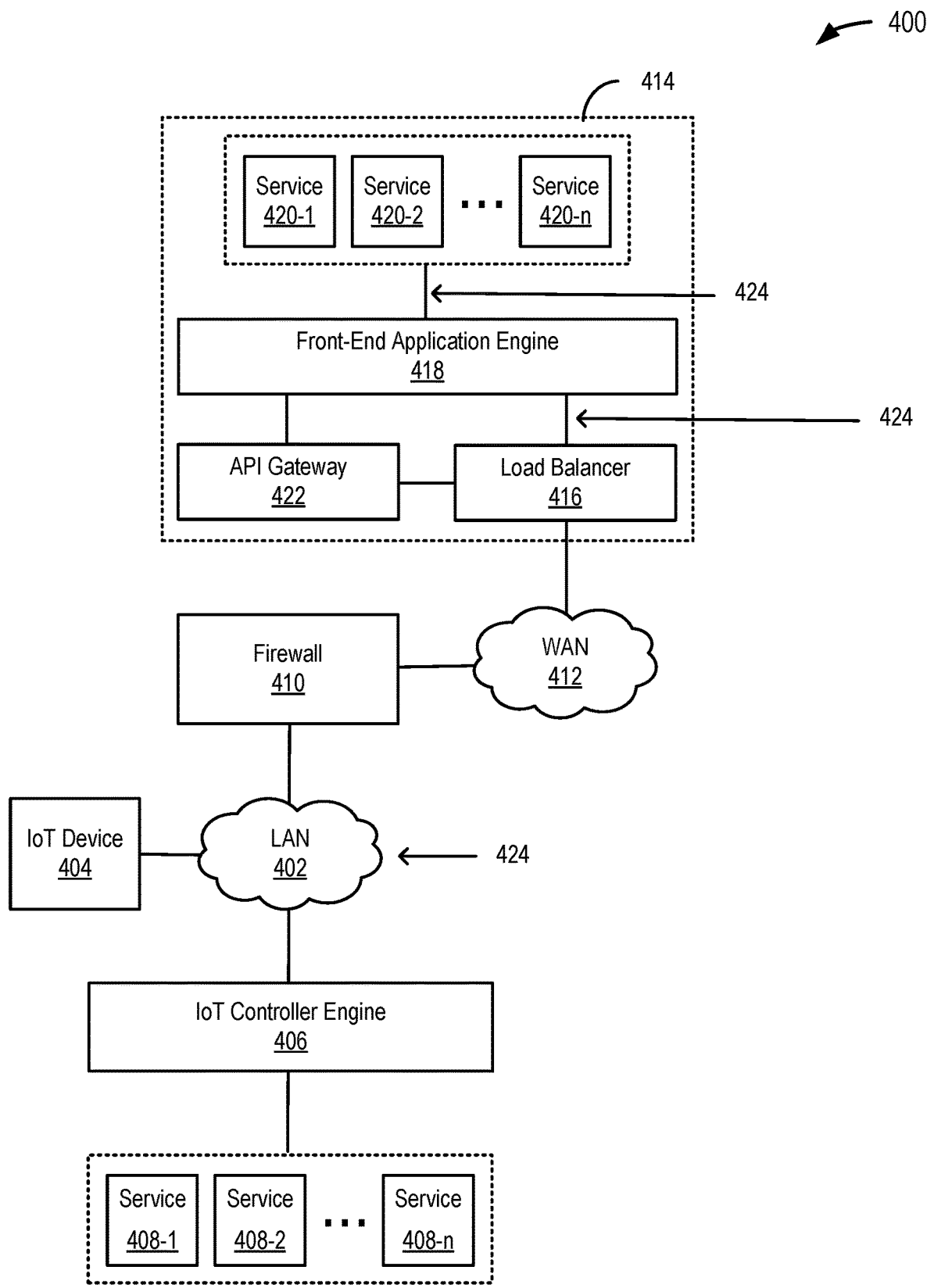
FIG. 4 depicts a diagram of an example of a hybrid IoT controller utilizing a service-oriented architecture (SOA).

Referring once again to the example of FIG. 1, in a specific implementation, the IoT controller engine 106 has both an "on-prem" and "off-prem" component, an example of which is provided by way of example in FIG. 4.

FIG. 4 depicts a diagram 400 of an example of a hybrid IoT controller utilizing a service-oriented architecture (SOA). As used in this paper, a SOA logically represents a business activity with a specified outcome, is self-contained, is a black-box for service requesters, and may consist of other underlying services. The diagram 400 includes a LAN 402, an IoT device 404 coupled to the LAN 402, an IoT controller engine 406 coupled to the LAN 402, a service 408-1 to a service 408-n (collectively, the services 408) coupled to the IoT controller engine 406, a firewall 410 coupled to the LAN 402, a WAN 412 coupled to the firewall 410, and an IoT application controller 414 coupled to the WAN 412. It may be noted that the IoT device 404, the IoT controller engine 406, and the firewall 410 can also be referred to as "on" the LAN 402 or "on-prem," while the IoT application controller engine 414 can also be referred to as "on" the WAN 410 (and not on the LAN 402) or "off-prem." The services 408 can also be referred to as on-prem services.

The LAN 402 is intended to represent a relatively local network of IoT devices and potentially other devices. The IoT device 404 can be implemented in a manner similar to that described for the IoT devices 104 with reference to FIG. 1. The IoT controller engine 406 can be implemented in a manner similar to that described for the IoT controller 106 with reference to FIG. 1 or the IoT controller 206 with reference to FIG. 2. The firewall 410 is intended to represent an example of a device located between on-prem devices (such as the IoT device 404 or IoT controller engine 406) of the LAN 402 and off-prem devices (such as the IoT application controller engine 414) or the WAN 412.

The IoT application controller engine 414 can be implemented in a manner similar to that described for the IoT controller 106 with reference to FIG. 1 or the IoT application controller 310 with reference to FIG. 3. In the diagram 400, the IoT application controller engine 414 includes a load balancer 416, a front-end application engine 418 coupled to the load balancer 416, a service 420-1 to a service 420-n (collectively, the services 420) coupled to the front-end application engine 418, and an API gateway 422 coupled to the load balancer 416 and the front-end application engine 418.

The front-end application engine 418 is intended to represent a front-end interface to the services 420. (The front-end application engine 418 and the services 420 can be collectively referred to as an application server.) In a specific implementation, the front-end application engine 418 can include a web server based on, e.g., simple object access protocol (SOAP). Alternative implementations include messaging server, representational state transfer (RESTful) HTTP server, OPC unified architecture (OPC-UA), Windows communication foundation (WCF), Apache Thrift, and SORCER.

In a specific implementation, an inspector (such as is included in the application-agnostic location-specific event generation engine 108 of FIG. 1) is coupled to the LAN 402 at the location identified by the arrow 424 (i.e., the inspector is "on" the LAN 402 and may be referred to as an on-prem inspector). In such an implementation, it would not be unusual for network traffic to be transmitted between the IoT device 404 and the IoT controller engine 406 in clear text. For example, the inspector can be implemented as a sniffer that is capable of detecting network traffic between the IoT device 404 and the IoT controller engine 406.

In a specific implementation, an inspector is operationally connected to the IoT application controller engine 414 at the locations identified by the arrows 424. In such an implementation, an inspector is located "behind" the load balancer 416 (and may be referred to as an application load balancer inspector) and inspectors are located between the front-end application engine 418 and each of the services 420 (e.g., there is an inspector in front of each of the services 420, which may be referred to as application service inspectors). Behind is intended to mean the load balancer 416 is between the inspector and the IoT device 404.

Referring once again to the example of FIG. 1, the application-agnostic location-specific event generation engine 108 is intended to represent a set of inspectors located at various locations throughout a network, as is described with reference to FIGS. 2-4, and associated event generation components. Application-agnostic means the inspectors and associated event generation components do not need to have prior knowledge of an application in order to generate events associated therewith. Location-specific means the inspectors are located on-prem or off-prem, and if located off-prem, may be located behind a load balancer and/or between each of a plurality of services and a front-end application engine. In a specific implementation, the application-agnostic location-specific event generation engine 108 inspects activities associated with an IoT application with no a priori knowledge about the IoT application. For example, the application-agnostic location-specific event generation engine 108 can pick up a key without understanding what the key is about. In a specific implementation, an inspection data set is network traffic, but with a focus on applications and application packet payload. It is not necessary to know what to expect, such as knowledge of fields and/or expected ranges of values for fields. In an IoT context, new protocols, versions, etc. come online all the time, making it difficult to create parsers that utilize a priori knowledge. In a specific implementation, the application-agnostic location-specific event generation engine 108 inserts a special value (e.g., a label or tag) into a field of an event to facilitate assisted learning. Advantageously, invoking or injecting known messages into activity fields improves and accelerates assisted learning. Once fields are identified using automated learning (including, e.g., assisted learning), such information can be used by the application-agnostic location-specific event generation engine 108, if applicable.

Depending upon implementation-specific, configuration-specific, or other factors, it may be desirable for the application-agnostic location-specific event generation engine 108 to be lightweight, making it easier to deploy as many inspectors as may be advantageous without difficulty and to correlate events associated with an activity across multiple inspectors. In a specific implementation, the associated event generation components are co-located with their respective inspectors, which can include an on-prem inspector, an application load balancer inspector, and/or application service inspectors, an example of which is provided by way of example with reference to FIG. 5.

Figure 5:
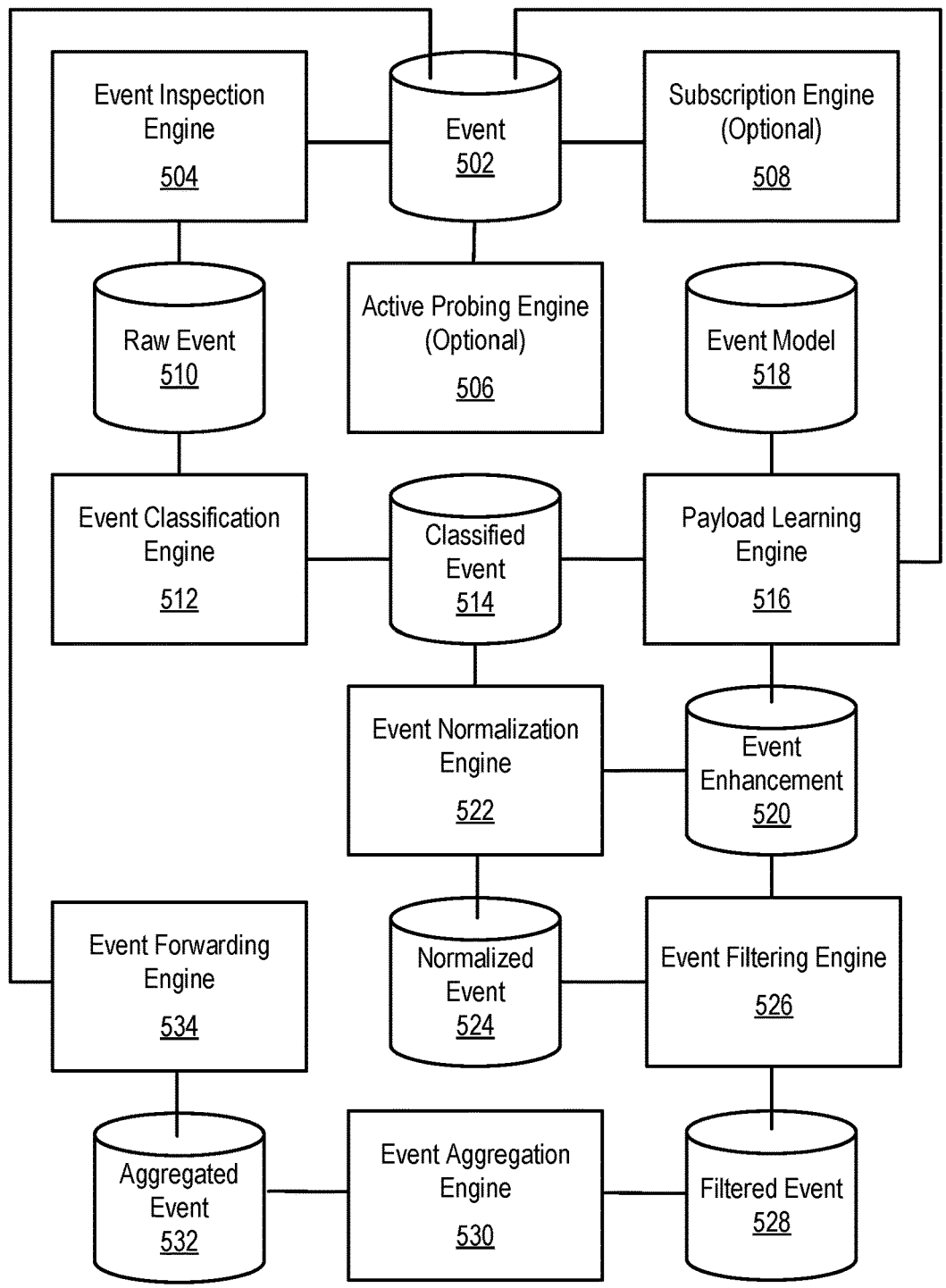
FIG. 5 depicts a diagram of an example of an application-agnostic location-specific event generation engine.

FIG. 5 depicts a diagram 500 of an example of an application-agnostic location-specific event generation engine. The diagram 500 includes an event datastore 502, an event inspection engine 504 coupled to the event datastore 502, an active probing engine 506 coupled to the event datastore 502, a subscription engine 508 coupled to the event datastore 502, a raw event datastore 510 coupled to the event inspection engine 504, an event classification engine 512 coupled to the raw event datastore 510, a classified event datastore 514 coupled to the event classification engine 512, a payload learning engine 516 coupled to the event datastore 502 and the classified event datastore 514, an event model datastore 518 coupled to the payload learning engine 516, an event enhancement datastore 520 coupled to the payload learning engine 516, an event normalization engine 522 coupled to the classified event datastore 514 and the event enhancement datastore 520, a normalized event datastore 524 coupled to the event normalization engine 522, an event filtering engine 526 coupled to the event enhancement datastore 520 and the normalized event datastore 524, a filtered event datastore 528 coupled to the event filtering engine 526, an event aggregation engine 530 coupled to the filtered event datastore 528, an aggregated event datastore 532 coupled to the event aggregation engine 530, and an event forwarding engine 534 coupled to the aggregated event datastore 532 and the event datastore 502. Some of the components illustrated in the diagram 500 can be implemented in part at a different physical location than other components, in particular, the events datastore 502 (and optional engines coupled thereto) and the payload learning engine 516 (and datastores coupled thereto).

The event datastore 502 is intended to represent events of various kinds. A significant subclass of events are network session events or "network events." In some implementations, network events can appropriately be referred to as "packet-based" (or "frame-based") events because network event capture is of packets or frames. In a specific implementation, a discrete network event is a network session. Alternatively or in addition, a discrete network event is a portion of a persistent network session that has been broken into chunks, wherein the chunks of a network session, in the aggregate, comprise a network session. Another potential subclass of events includes message transport events, such as messages using a lightweight publish/subscribe messaging transport (e.g., message queuing telemetry transport (MQTT)). Another potential subclass of events includes message log events, such as messages using a standard to separate message generators, systems that store messages, and message analysis and reporting engines (e.g., syslog). The event datastore 502 can be considered a "super" datastore that incorporates other datastores that include events, such as the raw event datastore 510, classified event datastore 514, the normalized event datastore 524, the filtered event datastore 528, and the aggregated event datastore 532.

The event inspection engine 504 is intended to represent a sensor for capturing events. The location of the sensor can determine event capture functionality. For example, if on-prem, the event inspection engine 504 can be implemented with a mirror to enable, e.g., packet sniffing, but in the cloud, the event inspection engine 504 may use a message "bus", packet forwarder (e.g., a script on a load balancer to forward packets), or log-based analysis. In a specific implementation, the event inspection engine 504 is lightweight, which is desirable to give the ability to correlate events captured by multiple different inspectors at multiple different locations. Newly captured events may be characterized as "raw" events and this characterization can persist until the event is normalized or otherwise abstracted in some way. Raw events may or may not be maintained in a datastore post-abstraction, depending upon whether it is desirable to facilitate audits, historical analysis, or otherwise make use of the raw event data.

Understanding the structure of IoT application data, and the payload an application carries in a network transmission, is an element in modeling the behavior of an IoT device. Existing IoT security solutions focus on modeling with network meta-data, but are not as effective when used for situations where more data protection is required, such as data link prevention (DLP). The event inspection engine 504 addresses these deficiencies by capturing network payload in clear text (e.g., for an on-prem implementation) or in a format suitable for a desired deployment model.

The active probing engine 506 is intended to represent an optional message generator for injecting messages into an event medium. Such messages can include SNMP queries, port scans, vulnerability scans (e.g., "bad" packets), or the like. Such messages and/or responses thereto are captured by the event inspection engine 504. In an implementation in which there is an active probing engine 506, the event inspection engine 504 can be characterized as including an active probing inspector (along with a packet event inspector, message event inspector, and/or log event inspector). Active probing can result in packet events, message events, and/or log events.

The subscription engine 508 is intended to represent an optional engine for subscribing to a message bus to get a response to a topic (e.g., by sending queries if a topic supports query and response) or to make the event inspection engine 504 an active message bus listener. In an implementation in which there is a subscription engine 508, the event inspection engine 504 can be characterized as including a subscriber-based inspector (along with a packet event inspector, message event inspector, and/or log event inspector). Subscription can provide access to packet events, message events, and/or log events.

The raw event datastore 510 is intended to represent a datastore of any events that can be captured by the event inspection engine 504. Active probing and subscription-based inspection can generate additional raw events. Because the event generation engine represented in the diagram 500 is application-agnostic, the raw events need not match any particular specification that is known to the event inspection engine 504 to store them in, e.g., a binary format in the raw event datastore 510.

The event classification engine 512 is intended to represent an engine used to characterize events as part of specific activities, such as port scans, SNMP queries, or the like. In a specific implementation, the event classification engine 512 uses domain knowledge from a domain knowledge datastore (not shown) to facilitate classification. In an implementation that includes the optional active probing engine 506, the event classification engine 512 identifies events generated in response to activities of the active probing engine 506 (e.g., responses to a probe), which can include events associated with a vulnerability scan (e.g., "bad" packets sent by the active probing engine 506 to trigger a response). In an implementation that includes the optional subscription engine 508, the event classification engine 512 can subscribe as a syslog client, to message bus (virtual or physical) to detect messages associated with a topic (e.g., as an active message bus listener), or the like; the subscription engine 506 can also send queries if the topic supports query and response.

The classified event datastore 514 is intended to represent a datastore of any events that can be classified by the event classification engine 512. Active probing and/or subscription-based events can be classified as responses to active probes (e.g., port scan, SNMP, or other responses), topic-related messages, syslog events, or the like, as applicable.

The payload learning engine 516 is intended to represent an engine used for specification-free learning. In a specific implementation, the payload learning engine 516 extracts attributes from payload of an IoT message in the form of key-value pairs and builds each attribute into an event. For example, the payload learning engine 516 can identify repeating sequences, which can be treated as repeating fields. Then the payload learning engine 516 can perform a prediction to generate deviation from range as an event (e.g., an anomalous event). Advantageously, specification-free learning is possible because the payload learning engine 516 does not need to know what an actual key is, just that it is an attribute.

Figure 6:
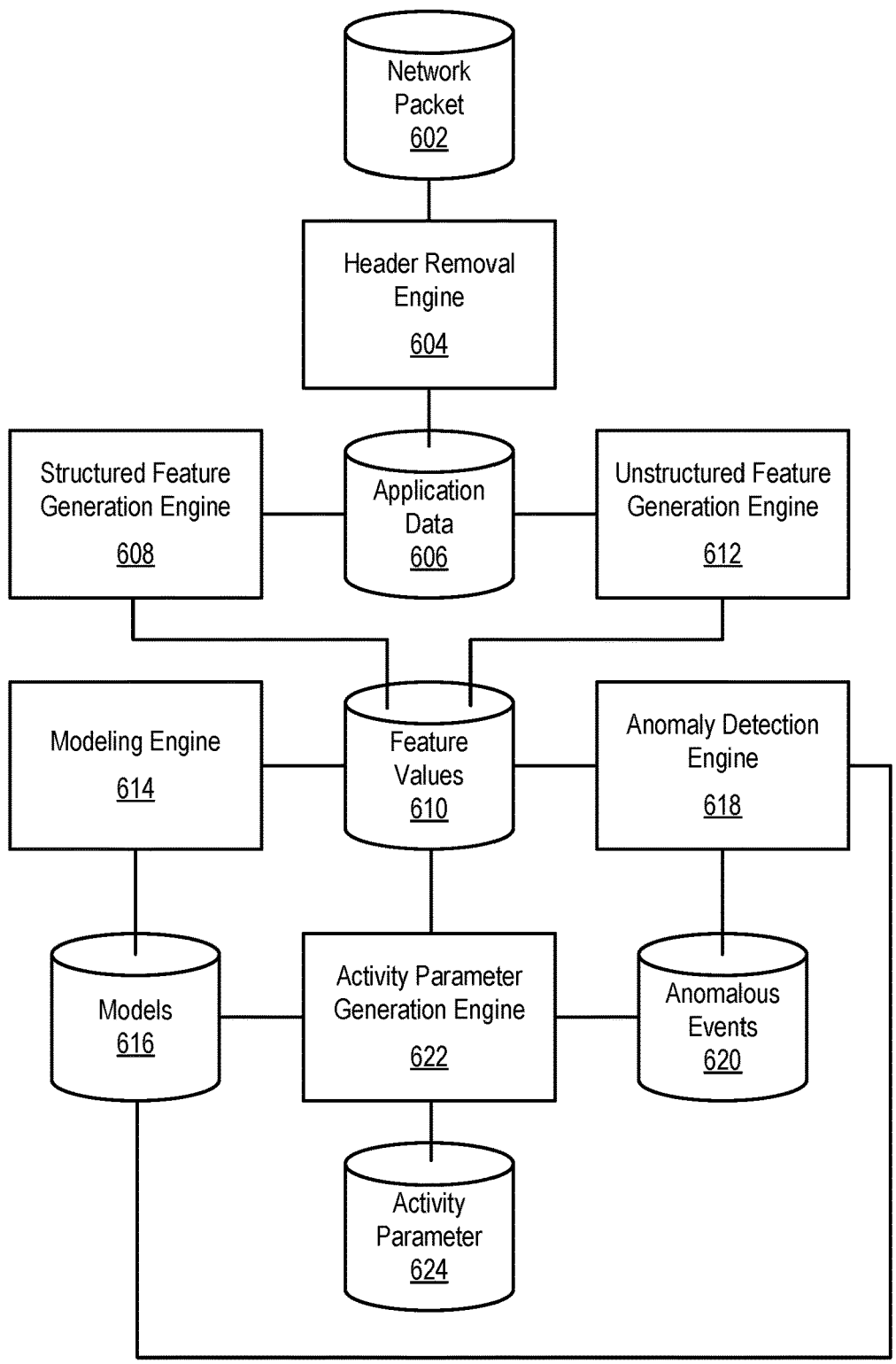
FIG. 6 depicts a diagram of an example of a payload learning engine.

FIG. 6 depicts a diagram 600 of an example of a payload learning engine. The diagram 600 includes a network packet datastore 602, a header removal engine 604 coupled to the network packet datastore 602, an application data datastore 606 coupled to the header removal engine 604, a structured feature generation engine 608 coupled to the application data datastore 606, a feature values datastore 610 coupled to the structured feature generation engine 608, an unstructured feature generation engine 612 coupled to the application data datastore 606 and the feature values datastore 610, a modeling engine 614 coupled to the feature values datastore 610, a model datastore 616 coupled to the modeling engine 614, an anomaly detection engine 618 coupled to the feature values datastore 610 and the models datastore 616, an anomalous events datastore 620 coupled to the anomaly detection engine 618, an activity parameter generation engine 622 coupled to the feature values datastore 610, the models datastore 616 and the anomalous events datastore 620, and an activity parameter datastore 624 coupled to the activity parameter generation engine 622. Advantageously, the payload learning engine can be trained for each key found (structured or unstructured) even without knowledge about what the key represents. For example, say a key-value pair is associated with temperature, but the payload learning engine does not know it. The key can be identified as a repeating pattern and the value can vary over time as 70, 71, 72, 70, 72, 43, . . . . While the payload learning engine may not be aware of what the value means, it can determine 70-72 is a "normal" value, while the 43 is an anomalous value, and generate an alert. (Of course, it may later determine a 43 is also considered "normal.")

The network packet datastore 602 is intended to represent a datastore from which a network packet is obtained. For illustrative purposes, a (first) network packet is described. The header removal engine 604 is intended to represent an engine that removes a header of the network packet. The application data datastore 606 is intended to represent a datastore that includes "payload" of the network packet. In a specific implementation, the application data datastore 606 includes a TCP or UDP payload, which may or may not have been encapsulated by an application header. Application data thus includes everything encapsulated by a layer 4 (L4) header or a lower-layer header (e.g., L3 or L2) if there is no L4 header.

The structured feature generation engine 608 is intended to represent an engine that looks for key-value pairs in network packet payload. For example, network packets associated with JSON, XML, HTTP (RESTful API), or the like are potentially predictable because they have a structured format. It may be noted there is currently no realistic way to have a specification for every application, so the structured feature generation engine 608 is not intended to necessarily represent an engine that relies upon an application specification, just one that can rely upon known protocol format.

The feature values datastore 610 is intended to represent a datastore that includes feature value data structures derived from structured applications by the structured feature generation engine 608 (and also feature value data structures derived from unstructured applications, as is discussed next).

The unstructured feature generation engine 612 is intended to represent an engine that looks for repeating binary patterns in network packet payload. In a specific implementation, the unstructured feature generation engine 612 extracts attributes into key and value pairs by detecting repeating patterns. For example, LLDP (a type-lens-value (TLV) format) or other format (e.g., Modbus, S7comm, et al.) can be analyzed by the unstructured feature generation engine 612. It may be noted, in a specific implementation, a TLV format can be used, where the "type" is characterized as a key of a key-value pair, the "lens" is ignored for feature value generation purposes, and the "value" is a value of the key-value pair. Tagging (e.g., to identify a request or response) can facilitate learning, as can the identification of headers and payload. For example, consider the hexadecimal string 'FE654AD000789 . . . ' It may be determined FE65' is a repeating pattern (key) and '4AD' is changing in a range. That knowledge can be used, over time, to build a model for the key-value pair with key 'FE65' and a value that includes '4AD.'

The modeling engine 614 is intended to represent an engine that creates a new model or updates an existing event model, which is maintained in the models datastore 616. The modeling engine 614 compares a feature value (e.g., key-value pair) from the feature values datastore 610 to an expected feature value (e.g., key and associated value range) in the models datastore 616 to expand a value range, identify a divergence (which can result in, e.g., splitting a model into multiple models), identify a convergence (which can result in, e.g., merging multiple models into one), or the like. In a specific implementation, event modeling is enhanced using labels or tags as part of an assisted learning process.

The anomaly detection engine 618 is intended to represent an engine that detects anomalous values for an event. In a specific implementation, the anomaly detection engine 618 identifies anomalies by comparing feature values in the feature values datastore 610 with an applicable model in the models datastore 610. Over time, the modeling engine 614 may update the models datastore 616 to indicate what was once considered anomalous is no longer considered anomalous.

The anomalous events 620 datastore is intended to represent a datastore in which anomalous events are stored. In a specific implementation, anomalous events are maintained within an events datastore (not shown), but with a label that identifies anomalous events as anomalous.

The activity parameter generation engine 622 is intended to represent an engine that generates an activity parameter from a feature value of the feature values datastore 610, an applicable model from the models datastore 616, and an applicable anomalous event from the anomalous events datastore 620 to generate an activity parameter for use in matching the feature value to a network activity (described in more detail later).

Referring once again to the example of FIG. 5, the event model datastore 518 is intended to represent a datastore of event models built for attributes, including a normal range of values. The normal range of values can be determined by analyzing repeating values and the values that follow.

The event enhancement datastore 520 is intended to represent a datastore of enhancements, such as tags, that can be applied to or identified in association with an event. For example, a tag can be used by a subscriber (e.g., as part of a special user login) to aid in the learning of events associated with the subscriber. As a more specific example, the user of an IoT device can use or allow the use of tags that can be picked up by the payload learning engine 516 (or as part of an assisted learning process) or provide certain patterns of a key to help the payload learning engine 516 to identify, e.g., a patient ID field. As another example, the payload learning engine 516 can identify patterns to be tagged with data structures in the event enhancement datastore 520. Enhancements can include anomalous event tags, which are applicable when, for example, the payload learning engine 516 uses an event model data structure in the event model datastore 518 in association with an event, but the event deviates from expected values.

The event normalization engine 522 is intended to represent an engine that normalizes a classified event from the classified event datastore 514 as enhanced using the event enhancement datastore 520. It may be noted that a classified event can in essence be the same as a raw event if the classification is "unknown," so for illustrative convenience, it is assumed the event normalization engine 522 normalizes classified events. In a specific implementation, events are normalized using one or more of a timestamp, tagging (e.g., from the event enhancement datastore 520), an ID (e.g., a user ID or event ID), or the like.

The normalized event datastore 524 is intended to represent a datastore that includes normalized events as data structures. Normalizing events enables later engines to perform an apples-to-apples comparison of events for, e.g., aggregation purposes, as well as filter using abstractions of message format.

The event filtering engine 526 is intended to represent an engine that filters sensitive data from normalized events. In a specific implementation, filtering includes deleting confidential values. Confidential values include, for example, values that are not supposed to be sent out of an enterprise network. To the extent it is desirable to draw a distinction, deletions can include deleting a value of a key-value pair (zeroing, randomizing, or the like), deleting a key-value pair, or deleting an event. In a specific implementation, filtering includes replacing a field with a tag from the event enhancement datastore 520. It may be noted that in an implementation that does not include a find-and-replace functionality to delete a field and insert a tag in its stead, the event filtering engine 526 may or may not use the event enhancement datastore 520 post-normalization.

The filtered event datastore 528 is intended to represent a datastore that includes events suitable for sharing outside of an enterprise network (e.g., following redaction) or that need not be further considered (e.g., because the filtered out events are redundant or otherwise uninteresting).

The event aggregation engine 530 is intended to represent an engine that combines related events into a single aggregated event, which it stores in the aggregated event datastore 532. Related events can include, for example, multiple discrete network events of a persistent session; events associated with the same source, user, time, or application; events that (based on, e.g., domain knowledge) might be related to an activity (e.g., login activity); events associated with an IoT device profile; or the like.

The event forwarding engine 534 is intended to represent an engine that forwards aggregated events from the aggregated events datastore 532 to the events datastore 502. To the extent the event datastore 502 includes a local datastore, forwarding may or may not be necessary (because, e.g., the event datastore 502 and the aggregated event datastore 504 may be implemented as a single local datastore). In an implementation in which multiple lightweight inspectors are implemented at specific geo-locations, the event forwarding engine 534 operates to share aggregated events from the respective aggregated event datastores 532 with each inspector, with a subset of inspectors, or with a repository that is not part of (or is shared across all of) the individual inspectors.

Referring once again to the example of FIG. 1, the application-agnostic location-specific event generation engine 108 can be implemented in one of a plurality of lightweight inspectors to monitor IoT applications. Depending on context, the application-agnostic location-specific event generation engine 108 can be referred to as a first engine (of a plurality of engines) or as a single engine comprising a plurality of specifically-located engines. Unless otherwise indicated, the former is presumed and the latter may in the alternative be referred to as an application-agnostic multi-location event generation system that includes a plurality of application-agnostic location-specific event generation engines.

The event datastore 110 is intended to represent a datastore of event data structures as captured and transformed by the application-agnostic location-specific event generation engine 108 (and other such engines, if applicable). In a specific implementation, at least some of the events include a representation of a transformed event associated with one of the IoT devices 104, where the event is transformed (e.g., normalized and/or aggregated) in a manner similar to that described with reference to FIG. 5. In an example of operation, the application-agnostic location-specific event generation engine 108 performs a create, read, update, or delete (CRUD) on the event datastore 110. Creation can include adding new events or tags (e.g., before and/or after a key or value); reading can include finding repeating patterns or other values of interest; updating can include replacing values with tags (e.g. to improve learning or redact sensitive data); and deleting can include removing sensitive or redundant data.

The activity parameter datastore 112 is intended to represent activity parameter output from the application-agnostic location-specific event generation engine 108 or a payload learning engine (see, e.g., FIG. 6) that also serves as input to the network activity constrained IoT application identification engine 114. A smallest unit of identification for an IoT device could be characterized as an event. An event data structure may or may not include a representation of an event that is not a network event, such as a local database access event, an event obtained from log message(s) via an active query, or the like. Because a network session of an IoT device of the IoT devices 104 is a network event (or a persistent network session can be "chunked" into a series of network events), the IoT device can be identified as a participant in an activity defined by events at least partially matching relevant event data structures in the event datastore 110 that represent network events of the IoT device. As used in this paper, an activity data structure is a labeled collection of events. IoT application behavior is sufficiently different from IoT device behavior that the smallest meaningful unit of identification for an IoT application is an activity (e.g., a file download).

The network activity constrained IoT application identification engine 114 is intended to represent an engine that learns about applications without a priori knowledge of the application via automated learning. Network activity constrained is intended to indicate the network activity constrained IoT application identification engine 114 learns about an application using network activities, as opposed to other types of activities. This is not to say other engines cannot be used to learn about an application using other activity. For example, application host data, such as CPU usage, interprocess communications, kernel services, or the like, could be obtained from an agent running on an application host and used in conjunction with the network activity constrained IoT application identification engine 114 to learn about an application. An engine that uses only network activities to learn about applications can be referred to as a network activity strictly constrained IoT application identification engine.

In a specific implementation, the network activity constrained IoT application identification engine 114 uses structured data learning to look for, e.g., key-value pairs in a JSON file and train for each key without a priori knowledge about the key-value pair. Instead or in addition, the network activity constrained IoT application identification engine 114 can use unstructured data learning to look for, e.g., repeating patterns to identify headers, payload, requests, and/or responses in a TVL-compatible file. In an alternative, the network activity constrained IoT application identification engine 114 uses both structured and unstructured data. Advantageously, a priori knowledge of protocols, applications, functions, or the like is not necessary to create models and detect regular or abnormal behavior. This technique can be referred to as automated learning (without parsing) because parsing requires a specification in order to create the parser. Automated learning, as opposed to parsing, enables building application behavior into models without knowing a specification of the application in advance. Automated learning has proven to be more effective at auto-learning keys than at least some parsers. Moreover, automated learning facilitates the identification and classification of an IoT application on the fly (automatically).

In a specific implementation, the network activity constrained IoT application identification engine 114 includes a hybrid automated and assisted learning engine. Alternatively or in addition, the network activity constrained IoT application identification engine 114 includes a plurality of distributed engines that together identify and correlate services created by a single application (or provide the applicable data to a single location for identification and correlation of services created by the single application).

Figure 7:
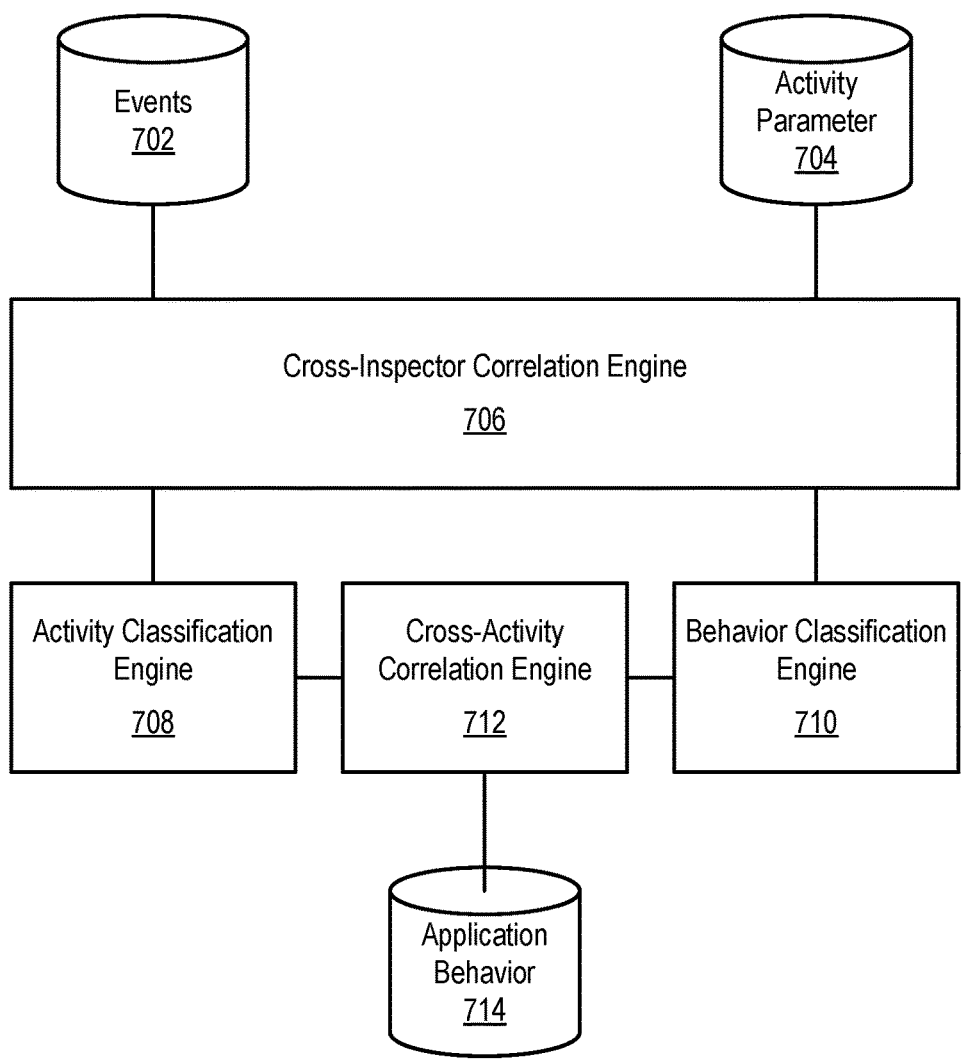
FIG. 7 depicts a diagram of an example of a network activity constrained IoT application identification engine.

FIG. 7 depicts a depicts a diagram 700 of an example of a network activity constrained IoT application identification engine. The diagram 700 includes an events datastore 702, an activity parameter datastore 704, a cross-inspector correlation engine 706 coupled to the events datastore 702 and the activity parameter datastore 704, an activity classification engine 708 coupled to the cross-inspector correlation engine 706, a behavior classification engine 710 coupled to the cross-inspector correlation engine 706, an activity correlation engine 712 coupled to the activity classification engine 708 and the behavior classification engine 710, and an application behavior datastore 714 coupled to the activity correlation engine 712.

The events datastore 702 is intended to represent a datastore that includes events. The events will typically be transformed (e.g., normalized, filtered, and/or aggregated). The activity parameter datastore 704 is intended to represent a datastore of activity parameters derived from events. The cross-inspector correlation engine 706 is intended to represent an engine that considers events and activity parameters from multiple different location-specific inspectors to identify activities. In a specific implementation, the cross-inspector correlation engine 706 matches events identified at a first location of a path between an IoT device and a service and at a second location, different from the first location, of the path between the IoT device and the service. By matching at the first location and the second location, the activity classification engine 708 is better able to figure out application-specific parameters of an activity. The cross-inspector correlation engine 706 can update the activity parameters datastore 704 as a better understanding of relevant parameters, and which parameters should be considered in the aggregate, emerges. Instead or in addition, the cross-inspector correlation engine 706 can identify a relationship between different services (e.g., between off-premises application services and on-premises services). The activity classification engine 708 can function in a manner similar to an event classification engine (some examples of which are described previously), but with activity modeling, activity anomaly detection, and behavior parameter generation.

The behavior classification engine 710 is intended to represent an engine that identifies activities as elements of a behavior. In a specific implementation, the behavior classification engine 710 builds a state-transition of different activities that comprise a behavior. Advantageously, the state transition of different activities in an IoT network facilitates identification by the network activity constrained IoT application identification engine of, e.g., a first activity always taking place before a second activity. Thus, not just values are learned, but also application behavior. A basic principle is "if A then B" (or !B), but associations can also be learned within an activity or outside of an activity to assist in event aggregation and make event aggregation more meaningful. For example, it is possible to identify different services (or microservices) serving an application. As another example, IoT application learning through the observation of network traffic can include both actual application messages and traffic among different services within an application (e.g., via the application-agnostic location-specific event generation engine 108 inspecting a message bus) that are not necessarily directly related to a client. The behavior classification engine 710 can function in a manner similar to an event classification engine (some examples of which are described previously), but with behavior modeling and behavior anomaly detection.

The cross-activity correlation engine 712 is intended to represent an engine that facilitates the building of activity models by correlating disparate activities (or first and second activities that are not yet known to be the same activity) rather like the cross-inspector correlation engine 706 correlates events across different inspectors. As the models are improved, the output to the application behavior datastore 714 grows increasingly robust. For example, the application behavior datastore 714 can include an application behavior that has a number of activities without a human-readable categorization, a "financial application behavior" categorization, or a specific application ID, depending upon how much is learned.

Referring once again to the example of FIG. 1, the application behavior datastore 116 is intended to represent a datastore of application behaviors learned via one or more of the processes described above. The application behaviors can be further augmented with non-network activity learning with, e.g., data from an application host environment reporting engine (not shown). To the extent an application identity can be established, the network activity constrained IoT application identification engine 114 stores the application identity in the application identity datastore 118.

The IoT application reporting engine 120 is intended to represent an engine that provides meaningful output for collectively processed signals. In a specific implementation, the IoT application reporting engine 120 reports alerts. For example, if the IoT application controller engine 106 runs into an error, the IoT application reporting engine 120 can send an error message to a network administrator to, e.g., contact support. Natural language processing (NLP) can be used to determine whether the report has sensitive data and generate a report with only non-sensitive elements exposed. As another example, if anomalous events are identified by the application-agnostic location-specific event generation engine 108 or other location-specific engines, or anomalous activities or behaviors are identified by the network activity constrained IoT application identification engine 114 or non-network activity constrained IoT application identification engines, the IoT application reporting engine 120 can generate an anomaly report. If the IoT application is behaving normally, but the application is identified as malicious, or if the IoT application is behaving abnormally, the IoT application reporting engine 120 can generate an alert for the benefit of, e.g., a network administrator. Alerts can be generated even for applications for which knowledge is incomplete. For example, if a temperature sensor periodically sends a message to an application controller that includes a temperature field that is consistently reporting a value of or near 0, but it suddenly changes to 37, a report could be generated even if the IoT application reporting engine 120 does not know anything about the temperature field (other than its value). The IoT application reporting engine 120 can also provide a report for anything else known about a given application from the application identity datastore 118.

Figure 8:
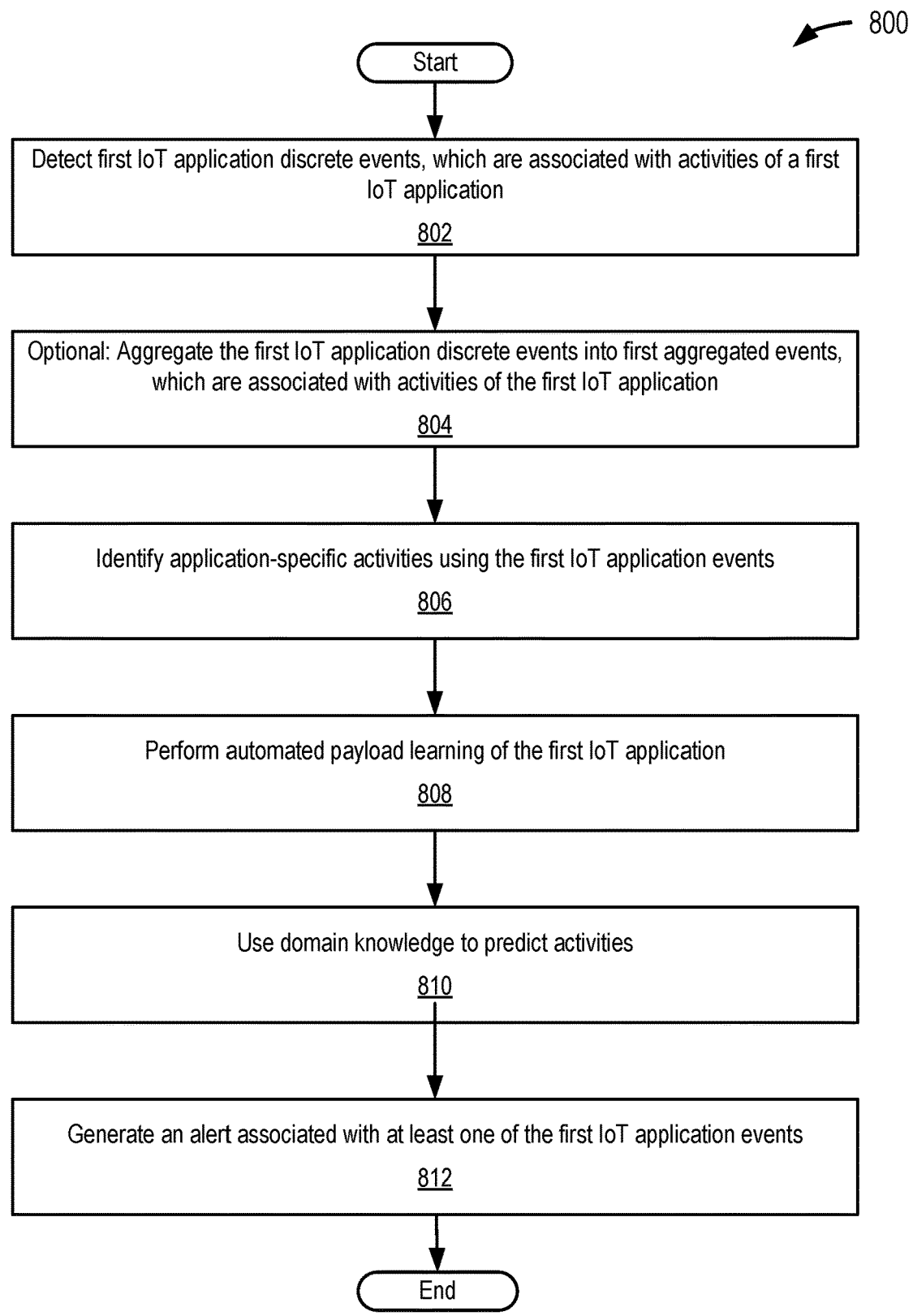
FIG. 8 depicts a flowchart of an example of a method for IoT application learning.

FIG. 8 depicts a flowchart 800 of an example of a method for IoT application learning. The flowchart 800 and other flowcharts described in this paper have modules that can be sequentially reordered or reorganized into parallel sequences if applicable.

The flowchart 800 begins at module 802, where first IoT application discrete events, which are associated with activities of a first IoT application, are detected. In a specific implementation, the events are detected via passive monitoring. A rather trivial type of detected discrete events are perhaps messages to or from a first IoT device to a first IoT application controller. It may be desirable to focus on detecting discrete events that take relatively few resources to characterize, such as information in a packet header, though other more resource-intensive techniques, such as deep packet inspection (DPI), can be used to obtain even more event data. Depending upon implementation-specific and other considerations, events used later for the purpose of IoT application learning or IoT application activity orchestration may or may not comprise only discrete events. In any case, activities are labeled collection of events. The module 802 can be carried out by an application-agnostic location-specific event generation engine, such as the application-agnostic location-specific event generation engine 108 of FIG. 1.

The flowchart 800 continues to module 804, where the first IoT application discrete events are aggregated into first aggregated events, which are associated with activities of the first IoT application. In the flowchart 800, module 804 is indicated to be optional because it is possible to implement or configure a system to perform application learning using only discrete events. A rather trivial example of aggregated events is a collection of heartbeat messages transmitted periodically by a first IoT device and treated as a single (aggregated) event for pattern matching purposes. However, aggregated events can be much more complex and even incorporate data that would not necessarily be associated with the first IoT device (or the first IoT application controller), but for a determination that a correlation between the first IoT application and an otherwise unrelated event has been identified. In a specific implementation, discrete events are aggregated to form aggregated events using machine learning. Common factor aggregation is a way to apply various different machine learning and deep learning algorithms by focusing on common factors (like all devices of same profile, same OS, using Windows, using telnet, all devices talking to a specific subnet, to name several) as applied to both detected and modeled behavior. For example, session events can be aggregate together. In another example, streaming events can be aggregated together. The events can be aggregated locally with respect to the first IoT application. For example, the events can be aggregated to form the aggregated events by a device implemented as part of a LAN with the first IoT device. It should be noted aggregated events that are labeled may be referred to as "activities" in this paper, but more generally activities are a labeled collection of one or more events, which can be discrete or aggregated. The module 804 can be carried out by an application-agnostic location-specific event generation engine, such as the application-agnostic location-specific event generation engine 108 of FIG. 1.

The flowchart 800 continues to module 806, where application-specific activities are identified using the first IoT application events. The first IoT application events serve as a signature of the first IoT application. Conceptually, activities can be characterized as streaming, file upload, management, or the like, along with features and/or dominant trends (e.g., for a security camera application, streaming may be dominant). In a specific implementation, the universe of activities is distilled into a relatively small set (e.g., defined activities can be limited to a hundred or fewer generally human-readable aggregated events, such as login, authentication, update request, download, install, etc.). In a specific implementation, a plurality of lightweight engines focus on a respective plurality of activities (e.g., downloads) or a relatively common subset of an activity (e.g., Windows® downloads). The module 806 can be carried out by a network activity constrained IoT application identification engine, such as the network activity constrained IoT application identification engine 114 of FIG. 1.

The flowchart 800 continues to module 808 where automated payload learning of the first IoT application is performed. Advantageously, automated payload learning allows learning about events associated with an application without reference to a specification of the application. In a specific implementation, automated payload learning results in the generation of activity parameters. The module 808 can be carried out by a payload learning engine, such as the payload learning engine 516 of FIG. 5 implemented as part of an application-agnostic location-specific event generation engine, such as the application-agnostic location-specific event generation engine 108 of FIG. 1. In an implementation that includes activity parameter generation, the module 808 can be carried out by an activity parameter generation engine, such as the activity parameter generation engine 622 of FIG. 6 implemented as part of a payload learning engine. The activity parameters can be used to learn activities and, ultimately, application behavior, as described above.

The flowchart 800 continues to module 810 where domain knowledge is used to predict activities. For example, figuring out what a repeating pattern, such as proprietary ID, is, can be accomplished by identifying the repeating pattern and applying domain knowledge. Advantageously, assisted learning can utilize tags or labels injected into activity fields by an inspector to rapidly learn about applications using domain knowledge. The module 810 can be carried out by a network activity constrained IoT application identification engine, such as the network activity constrained IoT application identification engine 114 of FIG. 1.

The flowchart 800 continues to module 812 where an alert associated with at least one of the first IoT application events is generated. Alerts can be generated for anomalous events, activities, or behaviors (or for non-anomalous events, activities, or behaviors associated with rogue applications). The module 812 can be carried out by an IoT application reporting engine, such as the IoT application reporting engine 120 of FIG. 1.

The techniques described in the preceding text and figures can be mixed and matched as circumstances demand to produce alternative implementations.

The invention claimed is:

1. A method, comprising:
   receiving a detected set of Internet of Things (IoT) application events, wherein the IoT application events are associated with activities of an IoT application executing on an IoT device;
   identifying, from a predetermined set of different types of activities, one or more application-specific activities;
   extracting one or more attributes from a plurality of payloads of IoT messages associated with the IoT application executing on the IoT device as a set of activity parameters and using extracted information to perform automated payload learning, wherein the extracting includes filtering out one or more confidential values;
   predicting a set of activities of the IoT application in accordance with the set of activity parameters at least in part by using domain knowledge;
   determining whether at least one of the IoT application events falls outside the predicted set of activities; and
   generating an alert associated with the at least one of the IoT application events when it is determined the at least one of the IoT application events falls outside the predicted set of activities.

2. The method of claim 1, wherein the IoT application events are detected via passive monitoring.

3. The method of claim 1, wherein the IoT application events are detected using deep packet inspection (DPI).

4. The method of claim 1, wherein the IoT application events are detected using subscription-based inspection.

5. The method of claim 1, wherein using the domain knowledge to predict the set of activities includes identifying a repeating pattern.

6. The method of claim 1, wherein using the domain knowledge to predict the set of activities includes utilizing tags or labels injected into activity fields of the IoT application events.

7. The method of claim 1, wherein an IoT application event of the IoT application events comprises a raw event.

8. The method of claim 1, wherein the IoT application events comprise one or more of network sessions, portions of network sessions, message transport events, and message log events.

9. A system, comprising:
   a processor configured to:
      receive a detected set of Internet of Things (IoT) application events, wherein the IoT application events are associated with activities of an IoT application executing on an IoT device;
      identify, from a predetermined set of different types of activities, one or more application-specific activities;
      extract one or more attributes from a plurality of payloads of IoT messages associated with the IoT application executing on the IoT device as a set of activity parameters and use extracted information to perform automated payload learning, wherein the extracting includes filtering out one or more confidential values;
      predict a set of activities of the IoT application in accordance with the set of activity parameters at least in part by using domain knowledge;
      determine whether at least one of the IoT application events falls outside the predicted set of activities; and
      generate an alert associated with the at least one of the IoT application events when it is determined the at least one of the IoT application events falls outside the predicted set of activities; and
   a memory coupled to the processor and configured to provide the processor with instructions.

10. The system of claim 9, wherein the IoT application events are detected via passive monitoring.

11. The system of claim 9, wherein the IoT application events are detected using deep packet inspection (DPI).

12. The system of claim 9, wherein the IoT application events are detected using subscription-based inspection.

13. The system of claim 9, wherein using the domain knowledge to predict the set of activities includes identifying a repeating pattern.

14. The system of claim 9, wherein using the domain knowledge to predict the set of activities includes utilizing tags or labels injected into activity fields of the IoT application events.

15. The system of claim 9, wherein an IoT application event of the IoT application events comprises a raw event.

16. The system of claim 9, wherein the IoT application events comprise one or more of network sessions, portions of network sessions, message transport events, and message log events.

17. The method of claim 1, wherein the detected set of IoT application events serve as a signature of the IoT application.

18. The system of claim 9, wherein the detected set of IoT application events serve as a signature of the IoT application.

* * * * *